(12) United States Patent
Fields

(10) Patent No.: US 11,452,400 B2
(45) Date of Patent: Sep. 27, 2022

(54) MASTICATING JUICER WITH IMPROVED ADJUSTABLE CAP

(71) Applicant: Greenfield World Trade, Inc., Fort Lauderdale, FL (US)

(72) Inventor: Timothy Fields, Fort Lauderdale, FL (US)

(73) Assignee: GREENFIELD WORLD TRADE, INC., Fort Lauderdale, FL (US)

(*) Notice: Subject to any disclaimer, the term of this patent is extended or adjusted under 35 U.S.C. 154(b) by 103 days.

(21) Appl. No.: 16/992,514

(22) Filed: Aug. 13, 2020

(65) Prior Publication Data
US 2021/0045566 A1 Feb. 18, 2021

Related U.S. Application Data

(60) Provisional application No. 62/887,029, filed on Aug. 15, 2019.

(51) Int. Cl.
*A47J 19/02* (2006.01)

(52) U.S. Cl.
CPC .................... *A47J 19/025* (2013.01)

(58) Field of Classification Search
CPC ........ A47J 19/025; A47J 19/027; A47J 19/06; A47J 19/02; A47J 43/046; A47J 19/00; A47J 43/07; A47J 19/023; A47J 43/042; A47J 43/085; A47J 43/24; A47J 43/255; A23N 1/02; A23N 1/00; B30B 9/12; B30B 9/128; B30B 9/14; B30B 9/02; B30B 9/121; B02C 23/10
USPC ......... 99/513, 510, 512, 509, 511, 495, 501, 99/502, 492; 241/152.1, 186.5, 188.1, 241/246, 258, 79, 24.11, 24.26, 260.1, 241/282.1, 82.1; 100/117, 145, 131; 366/133, 186, 157.3, 194, 249, 266, 318
See application file for complete search history.

(56) References Cited

U.S. PATENT DOCUMENTS

| 4,393,760 | A | * | 7/1983 | Hasegawa | A47J 19/025 100/145 |
| 6,637,323 | B2 | | 10/2003 | Kim | |
| 8,863,655 | B2 | | 10/2014 | Trovinger | |
| 2003/0154867 | A1 | * | 8/2003 | Kim | A47J 19/025 99/510 |

(Continued)

FOREIGN PATENT DOCUMENTS

CN 203539062 U 4/2014

*Primary Examiner* — Tu B Hoang
*Assistant Examiner* — Vy T Nguyen
(74) *Attorney, Agent, or Firm* — Michael E. Dockins; Shumaker, Loop & Kendrick, LLP

(57) ABSTRACT

A masticating juicer includes an auger configured to rotate within a drum to perform a masticating process with respect to at least one food item introduced into the masticating juicer with the masticating process producing a juice and a pulp. An end cap is coupled to an end of the drum and is adjustable relative to the drum with respect to an axial direction of the auger. The end cap includes a flexible ring disposed adjacent an end of the auger formed from a resiliently flexible material configured to flex in reaction to the pulp applying pressure to the flexible ring. The flexing of the flexible ring increases a cross-sectional flow area between the auger and the flexible ring to accommodate a back pressure generated by the pulp.

16 Claims, 5 Drawing Sheets

(56) References Cited

U.S. PATENT DOCUMENTS

| | | | |
|---|---|---|---|
| 2009/0049998 A1* | 2/2009 | Kim | B30B 9/128 |
| | | | 99/510 |
| 2013/0074707 A1 | 3/2013 | Asbury et al. | |
| 2014/0109776 A1* | 4/2014 | Kim | A47J 19/025 |
| | | | 99/513 |
| 2015/0007733 A1* | 1/2015 | Kim | A47J 19/025 |
| | | | 99/513 |
| 2017/0325616 A1* | 11/2017 | Holzbauer | A47J 19/06 |

* cited by examiner

MASTICATING JUICER WITH IMPROVED ADJUSTABLE CAP

CROSS-REFERENCE TO RELATED APPLICATIONS

This application claims the benefit of U.S. Provisional Application No. 62/887,029, filed on Aug. 15, 2019. The entire disclosure of the above application is incorporated herein by reference.

FIELD OF THE INVENTION

The present technology relates to kitchen appliances and, more particularly, to a masticating juicer providing adjustable back pressure that optimizes pulp and juice flow.

BACKGROUND OF THE INVENTION

This section provides background information related to the present disclosure which is not necessarily prior art.

Masticating juicers use a relatively slow turning (~80 RPM) auger system to squeeze and break apart food items such as fruits and vegetables, which yields more juice and extracts more nutrients than centrifugal juicing machines. The fruits or vegetables are fed into a feeding conduit and are broken apart by the slow turning auger before being pushed through a cone with hard ribs and screens where the fruits and vegetables are further broken down and squeezed. The interaction of the fruits and vegetables with the auger system results in juice being separated through the screen while a pulp is formed by the remainder of the fruits and vegetables that are not dispelled as the juice. The pulp generated by the juicing process is then pushed out of an end cap of the masticating juicer.

Some masticating juicers use an adjustable end cap for different food items in order to control the flow of the pulp out of the end cap. For example, such end caps may be rotated to adjust a gap present between the end cap and an axial end of the corresponding auger via a threaded connection. The axial adjustment of this gap results in the compressive pressure applied to the pulp to be changed due to the changing flow cross-section through the gap. Specifically, a loosening the adjustable end cap forms an increasing gap for pulp to be squeezed out of the end cap, thereby applying less pressure to the pulp exiting the juicer, whereas a tightening of the adjustable end cap forms a decreasing gap for the pulp, thereby applying more pressure to the pulp.

Different food items require different gap sizes and corresponding compressive pressures to optimize the juicing result. If the gap is adjusted to be too large due to the adjustable end cap being overly loosened, the food items may pass through the masticating juicer too quickly and without being sufficiently broken apart and compressed, thereby lowering the amount of juice resulting from the juicing process. In contrast, if the gap is adjusted to be too large due to being overly tightened, the food items may jam when attempting to exit the end cap, which can cause the motor of the masticating juicer to undesirable seize. It is therefore important to form the proper cross-sectional flow area out of the adjustable end cap in order to produce the desired juicing result as well as to prevent undesired stoppages of the masticating juicer.

It is therefore desirable to provide an adjustable end cap configured to automatically adjust the flow cross-section of the pulp exiting the masticating juicer in order to attain a desired juicing rate compensating for the different characteristics of the various different food items suitable for use with the masticating juicer.

SUMMARY OF THE INVENTION

The present technology includes articles of manufacture, systems, and processes that relate to a masticating juicer having an improved adjustable end cap assembly for optimizing a flow rate of pulp exiting the masticating juicer in order to compensate a pressure generated during the juicing process.

According to an embodiment of the present invention, a masticating juicer includes an auger configured to rotate within a drum to perform a masticating process with respect to at least one food item introduced into the masticating juicer with the masticating process producing a juice and a pulp. An end cap is coupled to an end of the drum. The end cap includes a flexible ring disposed adjacent an end of the auger. The end cap is formed from a resiliently flexible material configured to flex in reaction to the pulp applying pressure to the flexible ring.

According to further aspects of the present invention, the flexible ring may be formed from an elastomeric material. The elastomeric material may be silicone.

According to further aspects of the present invention, the flexible ring includes a tapered portion. The tapered portion tapers radially inwardly when extending away from the end of the auger with respect to an axial direction of the auger. The tapered portion includes a radially inwardly disposed lip forming an opening through the flexible ring through which the pulp passes. A flow area through the opening increases during a flexing of the flexible ring.

According to further aspects of the present invention, the tapered portion may include a truncated cone shape.

According to further aspects of the present invention, the tapered portion includes a tapered surface facing towards the end of the auger. The tapered surface may include a shape substantially corresponding to an axially aligned portion of the end of the auger.

According to further aspects of the present invention, the flexible ring may also include a cylindrical portion with the tapered portion extending radially inwardly from the cylindrical portion. The tapered portion may intersect the cylindrical portion adjacent a first end thereof disposed towards the end of the auger while a second end of the cylindrical portion engages a rigid portion of the end cap.

According to further aspects of the present invention, a gap present between the end of the auger and the flexible ring may increase during a flexing of the flexible ring.

According to further aspects of the present invention, the flexible ring bears against a rigid portion of the end cap during a flexing of the flexible ring.

According to further aspects of the present invention, the end cap may be configured to be adjustable with respect to an axial direction of the auger to vary an axial distance between the flexible ring and the end of the auger. The end cap and the drum may include cooperating threads in a manner wherein a rotation of the end cap corresponds to an adjustment of the end cap with respect to the axial direction of the auger.

According to further aspects of the present invention, the flexible ring may have a substantially V-shaped cross-section extended circumferentially. A pointed portion of the V-shaped cross-section may be disposed towards the end of the auger.

According to another embodiment of the present invention, a masticating juicer includes an auger configured to rotate within a drum to perform a masticating process with respect to at least one food item introduced into the masticating juicer with the masticating process producing a juice and a pulp. An end cap is coupled to an end of the drum. The end cap includes a rigid portion and a flexible ring coupled to the rigid portion. The flexible ring is disposed adjacent an end of the auger and is formed from a resiliently flexible material configured to flex away from the end of the auger to increase a flow area between the end of the auger and the flexible ring in reaction to the pulp applying pressure to the flexible ring when exiting the masticating juicer through the end cap. The end cap is configured to be adjustable with respect to an axial direction of the auger to vary an axial distance between the flexible ring and the end of the auger.

Further areas of applicability will become apparent from the description provided herein. The description and specific examples in this summary are intended for purposes of illustration only and are not intended to limit the scope of the present disclosure.

BRIEF DESCRIPTION OF THE DRAWING FIGURES

The drawings described herein are for illustrative purposes only of selected embodiments and not all possible implementations, and are not intended to limit the scope of the present disclosure.

DETAILED DESCRIPTION OF THE INVENTION

Figure 1:
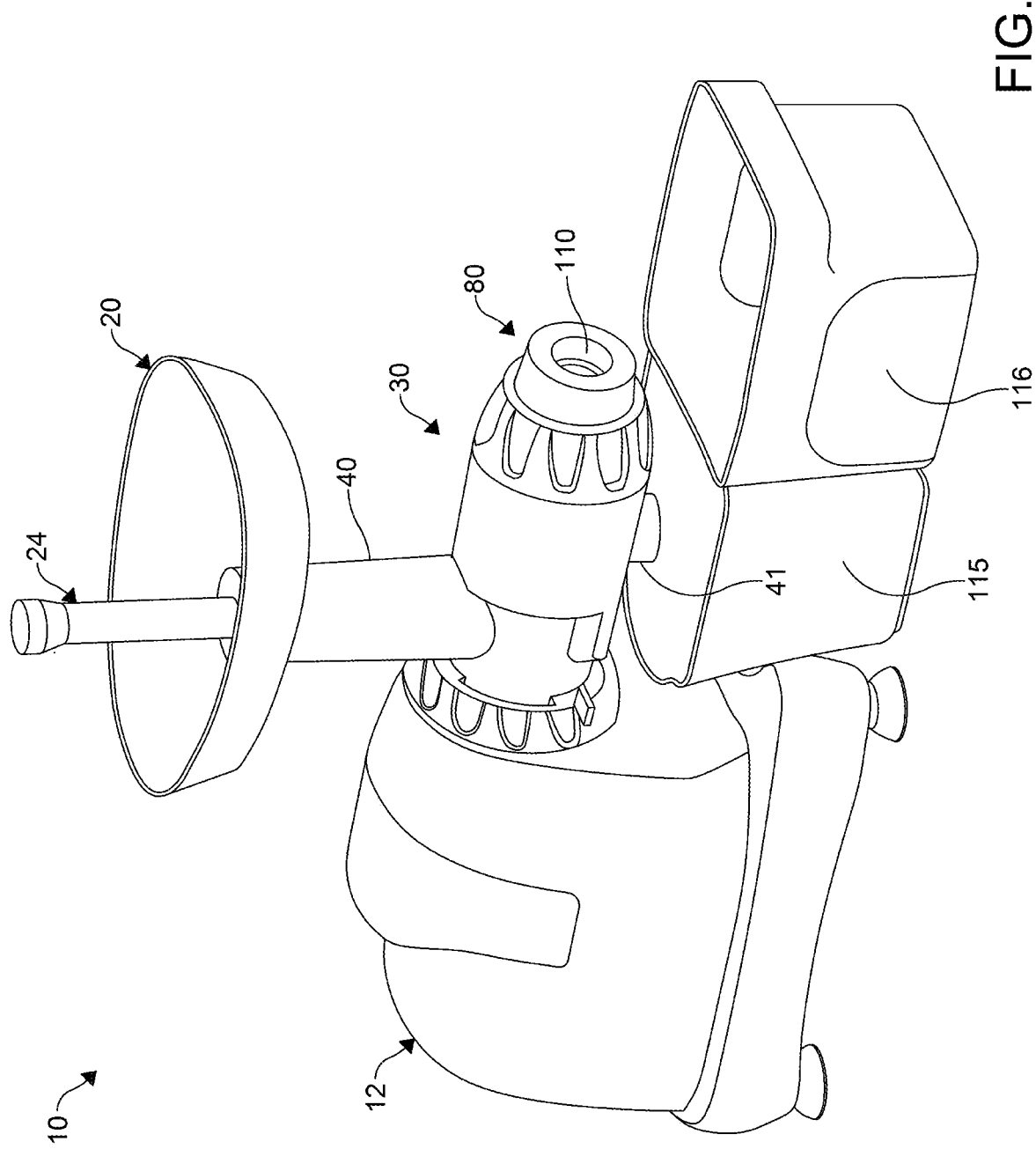
FIG. 1 is a perspective view of a masticating juicer according to an embodiment of the present invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to"

another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-6 illustrate a masticating juicer 10 according to an embodiment of the present invention, which is hereinafter referred to as the juicer 10 for brevity. The juicer 10 is configured for use with one or more fruits, vegetables, or any other suitable food items capable of being ground, pulped, squeezed, crushed, or otherwise broken apart or deformed during the formation of a liquefied substance or partially liquefied substance having a relatively low viscosity. As used hereinafter, the liquefied or partially liquefied substance having the relatively low viscosity resulting from the operation of the juicer 10 is referred to as a juice of the corresponding food item or items, whereas the more solid byproduct having a relatively higher viscosity resulting from the operation of the juicer 10 is referred to as a pulp of the corresponding food item or items. If multiple different food items are utilized, the juicer 10 may be operated to form the juice with respect to a plurality of the food items concurrently or the juicer 10 may be operated in independent steps with respect to each of the food items being introduced into the juicer 10, as desired. As used hereinafter, any fruits, vegetables, or combinations thereof passed through the juicer 10 are referred to as the food items for forming the juice and the pulp via the described juicing process.

The juicer 10 generally includes a main housing 12, a tray 20, a plunger 24, a drum 30, an auger 50, a screen cone 60, and an adjustable end cap 80 having a novel flexible ring 83. As explained hereinafter, the various different components of the juicer 10 may be releasably assembled to each other to facilitate the independent cleaning of the different components following use if the juicer 10.

The main housing 12 defines an opening 13 having a motor and gear assembly 14 disposed therein. The motor of the motor and gear assembly 14 is an electric rotary motor configured to cause the selective rotation of a rotor of the juicer 10 in the form of the auger 50. The motor may be any type of electric rotary motor having the torque necessary to masticate the desired food items into the desired juice product during normal operation of the juicer 10. The motor and gear assembly 14 may be configured to rotate the auger 50 at a relatively slow rotational speed such as about 80 revolutions per minute (rpm), as one non-limiting example. The juicer 10 may be configured to operate the motor and gear assembly 14 at a variety of different rotational speeds depending on the types of food items being juiced or the desired output rate of the juicer 10, as desired, while remaining within the scope of the present invention. Alternatively, the juicer 10 may be configured to operate the motor and gear assembly 14 at a single rotational speed, as desired. The gears of the motor and gear assembly 14 may be provided to convert the rotational speed of the motor to the desired rotational speed of auger 50. The motor and gear assembly 14 may be powered by an electric cord connected to a power outlet or may be powered by a portable battery unit, as desired.

The tray 20 includes a bottom surface 21 and a surrounding rim 22 in order to hold the food items prior to introduction into the drum 30. The bottom surface 21 may have any desired surface area and the rim 22 may have any desired height to maintain the desired food items within the tray 20 prior to passage into the drum 30. A food introduction opening 23 is formed in the bottom surface 21 of the tray 20 to allow for the food items disposed within the tray 20 to drop by gravity feeding into the drum 30.

The drum 30 is disposed below the tray 20 when the juicer 10 is in the assembled configuration shown in FIGS. 1 and 2. The drum 30 may be provided as an assembly formed by the cooperation of a drum body 32 and a drum cap assembly 70. The drum 30 houses the auger 50 and the screen cone 60 therein and is further configured for coupling to the main housing 12 and the end cap assembly 70.

The drum body 32 includes an auger housing 33 that is generally cylindrical in configuration and extends axially from a first end 34 to an opposing second end 35. The first end 34 of the auger housing 33 includes a coupling feature 36 for removably coupling the drum body 32 and the remainder of the drum 30 to the main housing 12. The removability of the drum 30 from the main housing 12 facilitates a cleaning of the components forming the drum 30 when separated from the electronic components housed within the main housing 12. The coupling feature 36 may be configured to affix the drum body 32 to a corresponding coupling feature 17 formed on the main housing 12. The coupling features 17, 36 may be complimentary helical tabs, threads, or the like formed on the respective drum body 32 and the main housing 12. The coupling features 17, 36 may be configured to allow for the drum body 32 to be axially pressed towards the main housing 12 and then rotated to a fixed rotational angle relative to the stationary main housing 12 to establish a desired position of the drum body 32 relative to the main housing 12, wherein the axial pressing and subsequent rotation of the drum body 32 relative to the main housing 12 provides an interference fit therebetween with respect to the axial direction of the auger housing 33.

A retention ring 18 may be disposed around the junction of the coupling features 17, 36 to aid in maintaining the axial and rotational position of the drum body 32 relative to the main housing 12 when in the coupled position. For example, an outer circumferential surface of the coupling feature 17 may include an outer thread configured for engagement with an inner thread disposed on an inner circumferential surface of the retention ring 18 in a manner wherein a rotational tightening of the thread of the retention ring 18 relative to the thread of the coupling feature 17 causes an axial pressing of an end portion of the retention ring 18 against a radially outwardly extending end portion of the auger housing 33. The retention ring 18 thereby prevents disengagement of the drum body 32 from the main housing 12 during operation of the juicer 10.

The auger housing 33 defines a substantially cylindrical opening 37 configured to receive the auger 50 and the screen cone 60 therein. The first end 34 of the auger housing 33 facing towards the main body 12 includes a shaft aperture 38 through which a rotary shaft 53 of the auger 50 is received for operational engagement with the motor and gear assembly 14 of the main housing 12 in a manner facilitating the selective rotation of the auger 50 within the auger housing 33. Specifically, the rotary shaft 53 may include a shape complimentary to a corresponding portion of the motor and gear assembly 14 that allows for the transmission of the rotary motion and torque generated by the motor and gear assembly 14 to the auger 50.

The drum body 32 further includes an inlet conduit 40 extending from an upper surface of the auger housing 33 (when coupled to the main housing 12) as well as an outlet conduit 41 extending from a lower surface of the auger housing 33 (again, when coupled to the main housing 12). The inlet conduit 40 is cylindrical in shape and provides communication between the food introduction opening 23 of the tray 20 and the opening 37 of the auger housing 33 to provide a pathway for the food items to pass through the juicer 10. The inlet conduit 40 and the food introduction opening 23 may be coupled to each other by removably press-fitting the inlet conduit 40 into the food introduction opening 23, as desired. The outlet conduit 41 is also cylindrical in shape and allows for the juice generated within the opening 37 to flow out of the auger housing 33 following the juicing process. The outlet conduit 41 may alternatively be provided as any form of opening formed in the bottom surface of the auger housing 33 so long as the juice can exit the auger housing 33 via the force of gravity after being processed from the food items passing through the juicer 10. The auger housing 33, inlet conduit 40, and outlet conduit 41 of the drum body 32 are shown as being formed from a single integral or monolithic structure, but the components forming the drum body 32 may alternatively be formed independently and subsequently removably coupled to each other, as desired.

The inlet conduit 40 includes a length (height when in the installed position of the drum 30) suitable for preventing accidental entry of the fingers of the operator of the juicer 10 into the auger housing 33 when forcing the food items into the opening 37 through the inlet conduit 40. The inlet conduit 40 is configured to receive the plunger 24 therein to apply pressure to the food items being introduced into the auger housing 33. The plunger 24 includes a handle 25, a radially outwardly extending protective flange 26 disposed at an end of the handle 25, and a conical pushing element 27 at an end of the plunger 24 opposite the handle 25. The handle 25 is configured to be gripped by the operator while the protective flange 26 once again prevents entry of any portion of the hand of the operator into the inlet conduit 40 during the pushing of the food items therethrough. The pushing element 27 includes a pushing surface arranged perpendicular to the axial direction of the inlet conduit 40 for contact with the food items passing through the inlet conduit 40. An annular sealing element 28 formed from a resiliently flexible material is disposed within an annular groove formed around a circumference of the pushing element 27. The sealing element 28 is configured to maintain engagement with an inner circumferential surface of the inlet conduit 40 during motion of the plunger 24 within the inlet conduit 40.

The auger 50 is substantially cylindrical in shape as it extends axially from a first end 51 to a second end 52 thereof, wherein the first end 51 of the auger 50 forms the aforementioned rotary shaft 53 thereof configured for rotational engagement with the motor and gear assembly 14 of the main housing 12. The auger 50 includes, when progressing in the axial direction thereof from the first end 51 to the second end 52, the rotary shaft 53, an inlet segment 54, a compression segment 55, an outlet segment 56, and an end surface 57 disposed at the second end 52 of the auger 50. At least one substantially helical thread 58 extends along the inlet segment 54, the compression segment 55, and the outlet segment 56 to aid in breaking apart and/or compressing the food items while also forcing the ground food items in the axial direction of the auger 50 towards the second end 52 thereof due to the inclination of each of the threads 58 as each of the threads 58 wind around the auger 50. The pitch of each of the threads 58 may vary as each of the threads 58 progresses in the axial direction of the auger 50 in accordance with the chopping/grinding/compressing action being performed by each of the threads 58 in accordance with each of the different segments 54, 55, 56 of the auger 50.

The inlet segment 54 is substantially cylindrical in shape with a rectangular cross-sectional shape and includes a maximized radially outward extension of each of the corresponding threads 58 relative thereto, thereby forming relatively large radial openings between adjacent windings of each of the threads 58 to allow for the food items to be more easily received therein prior to the initiation of the chopping/grinding/compressing process performed by the auger 50. The compression segment 55 includes a bulbous cylindrical shape forming a substantially elliptical cross-sectional shape with a minor axis of the elliptical shape having a greater diameter than a diameter of the inlet segment 54. The outlet segment 56 is substantially cylindrical in shape with a rectangular cross-section and may include a diameter substantially equal to that of the inlet segment 54. A radial height of each of the threads 58 is decreased relative to the outer circumferential surface of the auger 50 within the compression segment 55 and the outlet segment 56 in comparison to the inlet segment 54. The end surface 57 is arcuate in shape and includes a substantially semi-elliptical cross-sectional shape projecting axially at the second end 52 of the auger 50, wherein an axially distal portion of the end surface 57 is disposed on the axis of rotation of the auger 50.

The auger 50 is received within the screen cone 60, which is in turn received within the auger housing 33 around the auger 50 to generally position the screen cone 60 between an inner circumferential surface of the auger housing 33 and an outer circumferential surface of the auger 50. The screen cone 60 includes, when progressing axially from a first end 61 to a second end 62 thereof, an inlet segment 64 corresponding to and axially aligned with the inlet segment 54, a compression segment 65 corresponding to and axially aligned with the compression segment 55, an outlet segment 66 corresponding to and axially aligned with the outlet segment 56, and an end collar 67 surrounding a transition of the auger 50 from the outlet segment 56 to the end surface 57. Each of the threads 58 of the auger 50 includes a variable radial height relative to the axis of rotation thereof to form a relatively small radial gap between the radial outermost surface of each of the windings of each of the threads 58 and the inner circumferential surface of each of the segments 64, 65, 66 of the screen cone 60.

The inlet segment 64 includes an arcuate partially cylindrical cross-section resembling a segment of a circle with the inlet segment 64 extending at a position below the auger 50 when the drum 30 is in the installed position. The inlet segment 64 forms a first screen element 68 having a plurality of openings formed therein. The first screen element 68 allows for any juices formed between the inlet segments 54, 64 of the auger 50 and the screen cone 60 to flow downwardly by the force of gravity into a juice collection region 39 of the opening 37 present within the auger housing 33 formed immediately below the screen cone 60. The juice collection region 39 in turn outlets to the outlet conduit 41.

The compression segment 65 of the screen cone 60 is substantially conical in shape with an inward tapering as the compression segment 65 progresses towards the second end 62 of the screen cone 60. The compression segment 65 includes a plurality of radially inwardly extending ribs 63 projecting towards each of the corresponding threads 58 of the auger 50 disposed along the inlet segment 64 of the screen cone 60. Each of the ribs 63 extends longitudinally in the axial direction of the auger 50 with adjacent ones of the ribs 63 spaced apart circumferentially from each other. The ribs 63 aid in breaking apart the food items as the food items attempt to pass over the ribs 63 during the axial movement of the food items while the continuously reducing radial space present between the outer circumferential surface of the auger 50 and the inner circumferential surface of the screen cone 60 aids in compressing and thus squeezing the food items as they progress in the axial direction of the auger 50.

The outlet segment 66 is substantially cylindrical in shape and forms a second screen element 69 having a plurality of openings formed therein. The second screen element 69 similarly allows for any juices formed between the outlet segments 56, 66 of the auger 50 and the screen cone 60 to flow downwardly by the force of gravity into the juice collection region 39 of the auger housing 33 and eventually through the outlet conduit 41. Each of the threads 58 disposed along the outlet segments 56, 66 may include a maximized pitch for axially pushing the food items beyond the end surface 57 of the auger 50 and the end collar 67 of the screen cone 60.

The auger 50 and the screen cone 60 are once again provided independently to allow for an ease of cleaning thereof. The screen cone 60 may be axially slid over the auger 50 to form an assembly that is then axially inserted within the drum body 32 or the auger 50 may be inserted into the drum body 32 prior to the axial sliding of the screen cone 60 over the auger 50. The opening 37 formed within the auger housing 33 is shaped to locate the screen cone 60 with each of the screen elements 68, 69 facing downwardly towards the juice collection region 39.

The drum cap assembly 70 is configured for removable coupling to the second end 35 of the auger housing 33 to surround the end collar 67 of the screen cone 60 as well as the end surface 57 of the auger 50. The drum cap assembly 70 includes a first element 71 and a second element 72. The first element 71 includes a cylindrically shaped large diameter portion 73 and a cylindrically shaped small diameter portion 74 with a shoulder 75 formed at the transition therebetween. An end of the large diameter portion 73 opposite the shoulder 75 includes a coupling feature 76 for removably coupling the drum cap assembly 70 to a complimentary coupling feature 38 present at the second end 35 of the auger housing 33. The complimentary coupling features 38, 76 may be similar to the complimentary coupling features 17, 36 including an axial insertion of the coupling feature 76 into the coupling feature 38 and a subsequent rotation of the drum cap assembly 70 relative to the auger housing 33 to form an interference fit therebetween. Alternative complimentary coupling features may also be utilized, such as complimentary inner and outer threads, as desired, so long as the drum cap assembly 70 is capable of removable coupling to the auger housing 33.

The second element 72 surrounds the large diameter portion 73 of the first element 71 and is configured for direct engagement with the annular second end 35 of the auger housing 33. An annular gasket 77 is coupled to an end of the second element 72 and is configured for compression between the second element 72 and the second end 35 of the auger housing 33 when the drum cap assembly 70 is coupled to the auger housing 33. The shoulder 75 of the first element 71 is also configured for engagement with the end collar 67 of the screen cone 60 when the drum cap assembly 70 is coupled to the auger housing 33.

The tray 20, the plunger 24, the drum body 32, the auger 50, the screen cone 60, and the drum cap assembly 70 may generally be formed from any combination of substantially rigid materials, such as various different plastics or metals. Some elements, such as the drum body 32, may be provided as transparent or semi-transparent to allow for visual inspection of the juicing process during operation of the juicer 10.

Figure 5:
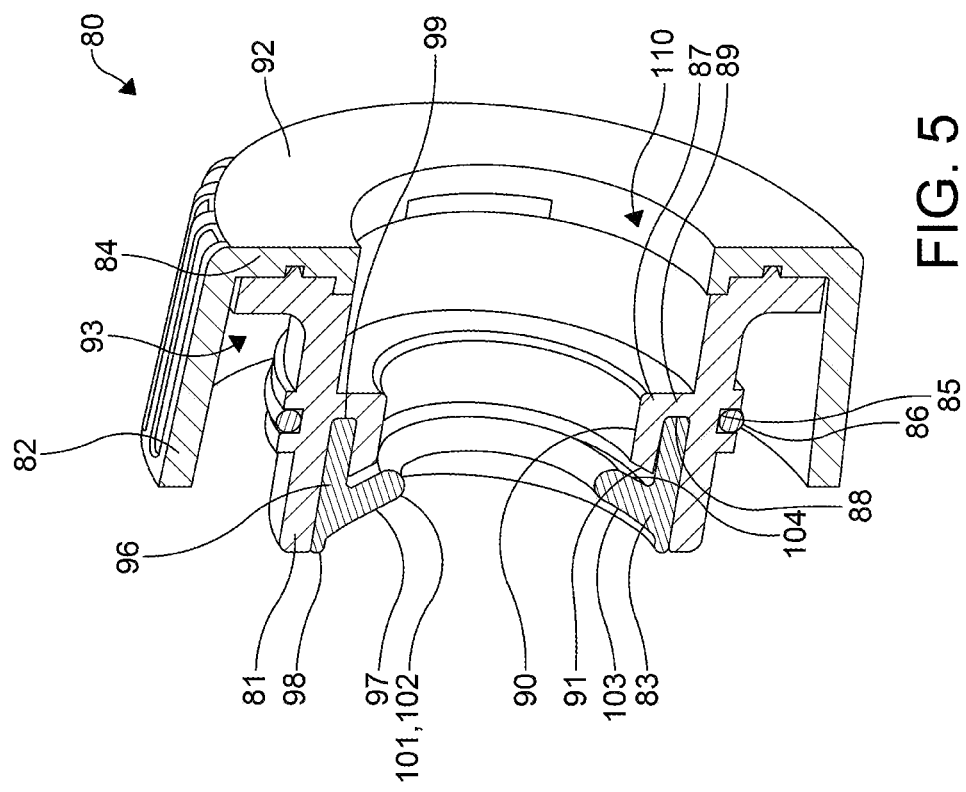
FIG. 5 is a cross-sectional view of the adjustable end cap assembly as taken from the perspective of section lines 5-5 of FIG. 4.
Figure 4:
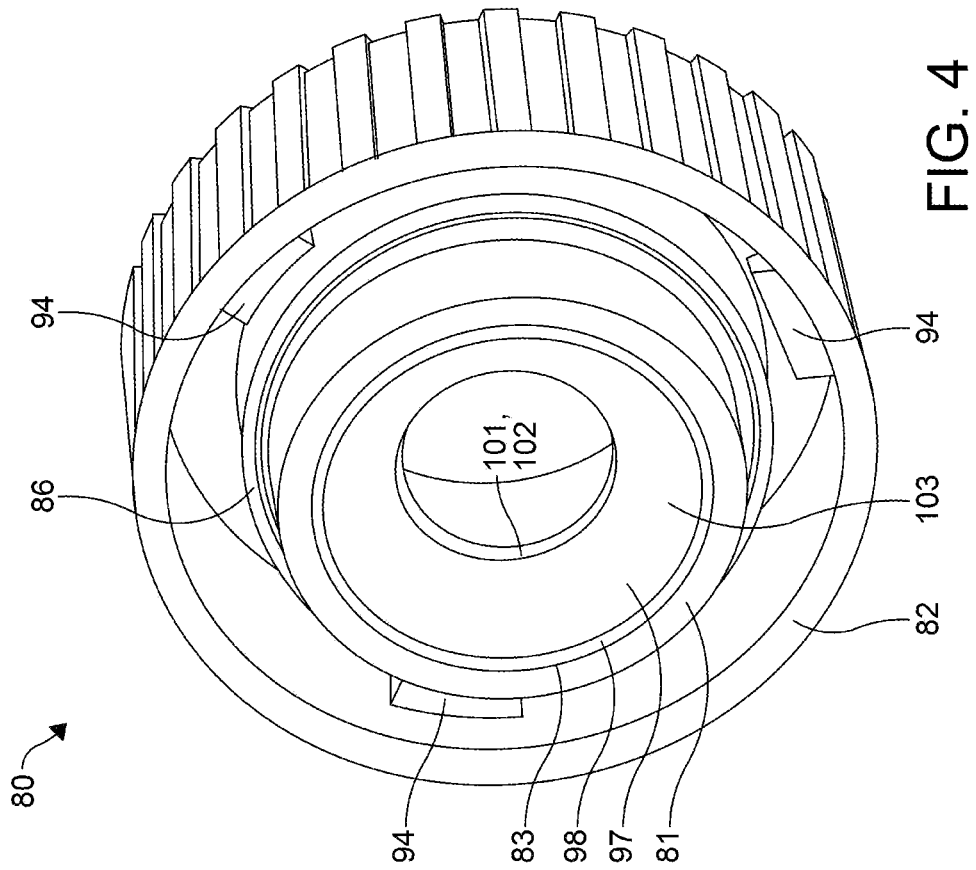
FIG. 4 is a perspective view of the adjustable end cap assembly in isolation.
Figure 6:
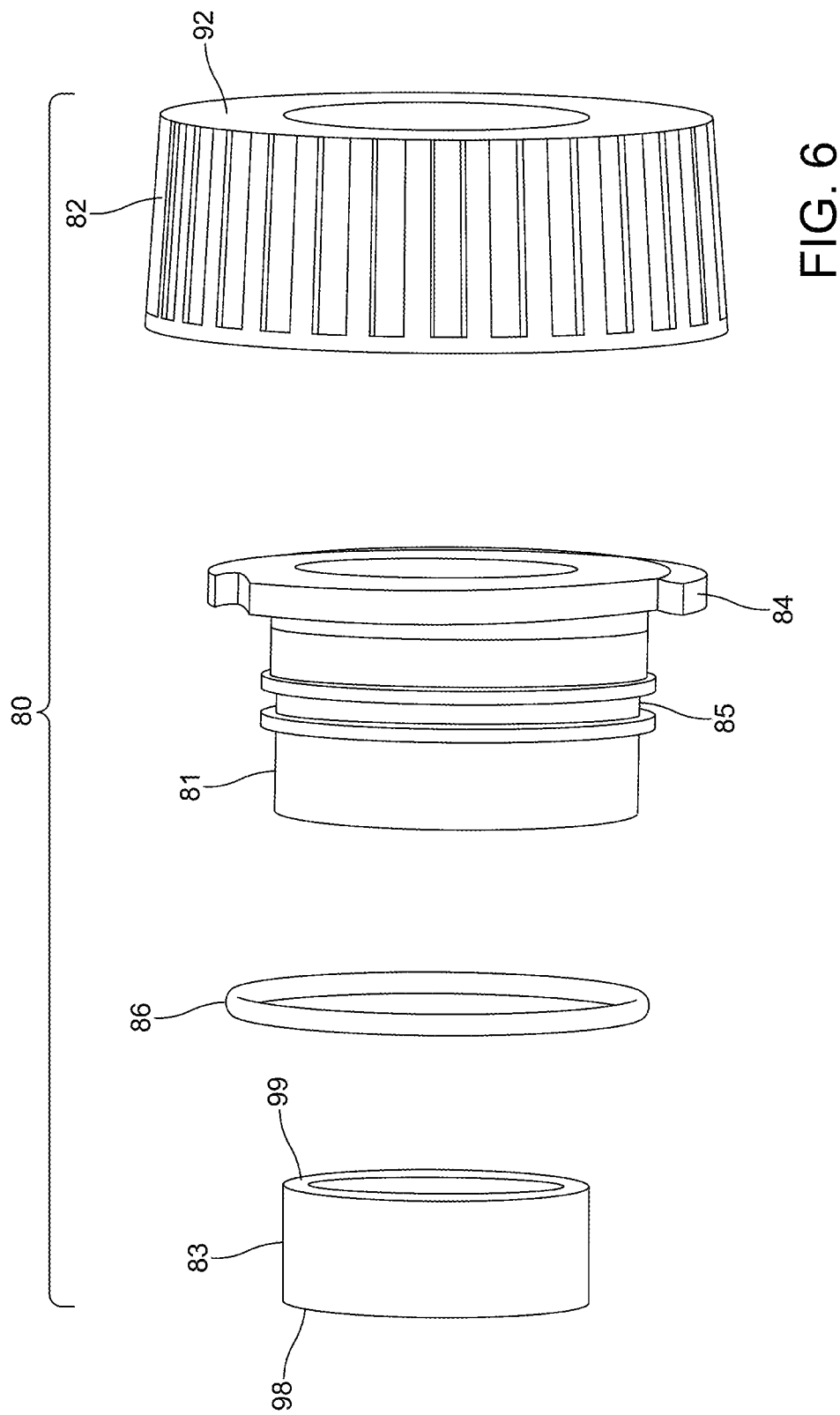
FIG. 6 is an exploded side perspective view of the adjustable end cap assembly of FIGS. 4 and 5.

The adjustable end cap 80 is configured for axial adjustment relative to the drum cap assembly 70, and more specifically, the first element 71 thereof. As best shown in FIGS. 4-6, the adjustable end cap 80 is shown as an assembly including an inner element 81, an outer element 82, and a flexible ring 83.

The inner element 81 is cylindrical in shape and includes a flanged portion 84 extending radially outwardly at an axial end thereof disposed opposite the drum cap assembly 70. An outer circumferential surface of the inner element 81 includes an annular groove 85 configured to receive an annular O-ring 86 therein, wherein the O-ring 86 is configured for sealing engagement with an inner circumferential surface of the small diameter portion 74 of the first element 71 that is maintained regardless of the axial position of the adjustable end cap 80 relative to the drum cap assembly 70. A ring retaining collar 87 extends radially inwardly from an inner circumferential surface of the inner element 81 and forms a ring receiving groove 88 configured to receive a portion of the flexible ring 83 therein. The ring retaining collar 87 includes a substantially L-shaped cross-section that extends annularly around a circumference of the inner element 81. The L-shaped cross-section of the ring retaining collar 87 is formed by a radial portion 89 and an axial portion 90, wherein the axial portion 90 extends away from a radially inward end of the radial portion 89 in a direction towards the end surface 57 of the auger 50 when the juicer 10 is in the assembled configuration. An end surface 91 of the axial portion 90 disposed opposite the radial portion 89 may be tapered to be substantially conical in shape.

The outer element 82 is cylindrical in shape and includes an end portion 92 coupled to the flanged portion 84 of the inner element 81 via interlocking complimentary shapes present therebetween. An annular space 93 is formed between the inner element 81 and the outer element 82 that is configured to axially and adjustably receive the small diameter portion 74 of the first element 71 of the drum cap assembly 70 therein. An inner circumferential surface of the outer element 82 includes an inner thread 94 that is configured for engagement with an outer thread 95 (FIG. 3) formed on an outer circumferential surface of the small diameter portion 74 of the first element 71. In the illustrated embodiment, the inner thread 94 is provided as a plurality of circumferential spaced thread segments (FIG. 4), but alternative configurations may be utilized without departing from the scope of the present invention. The helical shape of the cooperating threads 94, 95 causes the axial position of the adjustable end cap 80 to be dependent on the rotational position thereof relative to the drum cap assembly 70.

The flexible ring 83 is annular in shape and is formed from a resiliently flexible material. As used herein, the phrase resiliently flexible material refers to a material that, when at room temperature, has the ability to flex or otherwise deform when subjected to a force and to then elastically return to an original configuration thereof when the force is released. The material forming the flexible ring 83 may also be selected to include a suitable strength for withstanding the pressures encountered during operation of the juicer 10 without tearing or otherwise failing when the pulp generated by the juicing process passes thereover. The flexible ring 83 may be formed from silicone or another suitable elastomeric material, as desired.

The flexible ring 83 is formed as a monolithic (integral) structure including a cylindrical portion 96 and a tapered portion 97. The cylindrical portion 96 and the tapered portion 97 may cooperate to form a substantially V-shaped cross-section with a pointed portion of the V-shaped cross-section disposed adjacent the end surface 57 of the auger 50. The V-shaped cross-section is extended circumferentially about the axis of rotation of the auger 50. The entirety of the flexible ring 83 including each of the co-extensive portions 96, 97 may be formed in a suitable molding process, as one non-limiting example.

A first end 98 of the cylindrical portion 96 forms a rim facing towards the end surface 57 of the auger 50 and an oppositely arranged second end 99 of cylindrical portion 96 is received within the ring receiving groove 88 of the inner element 81. The cylindrical portion 96 extends axially in the same direction as the auger 50 with a central axis of the cylindrical portion 96 aligned with the axis of rotation of the auger 50. The rim formed at the first end 98 of the cylindrical portion 96 may include a reduced thickness in comparison to the remainder of the cylindrical portion 96. The rim formed by the first end 98 of the cylindrical portion 96 may also be disposed co-planar with an end of the inner element 81 facing towards the auger 50 with the rim disposed radially inwardly of the end of the inner element 81 such that any pulp passing through the flexible ring 83 passes directly between the radially outermost portion of the end surface 57 of the auger 50 and the rim of the flexible ring 83.

The tapered portion 97 extends radially inwardly from a position at or adjacent the first end 98 of the cylindrical portion 96 wherein the tapered portion 97 and the cylindrical portion 96 intersect. The tapered portion 97 is arranged at an incline relative to the axial direction of the auger 50 and tapers radially inwardly as the tapered portion 97 extends axially away from the first end 98 of the cylindrical portion 96 in a direction towards the second 99 thereof. The tapering of the tapered portion 97 may be consistent to form a tapered portion 97 having a shape of a truncated cone, may be arcuate to include a concave shape facing towards and generally matching the convex shape of the arcuate end surface 57 of the auger 50, or may be arcuate to include a concave shape facing towards and having a different curvature than the end surface 57 to cause a radially inward lip 101 of the tapered portion 97 to be axially spaced a slightly greater distance from the end surface 57 than the portion of the tapered portion 97 intersecting the cylindrical portion 96. The annularly extending lip 101 forms a central opening 102 through the flexible ring 83 through which the pulp generated by the juicing process can exit the juicer 10 when passing through the adjustable end cap 80.

The tapered portion 97 includes a first surface 103 facing towards the end surface 57 of the auger 50 and an opposing second surface 104 facing towards the ring retaining collar 87, wherein each of the first surface 103 and the second surface 104 is tapered. As mentioned above, depending on the curvature of the first surface 103, an axial gap present between the end surface 57 of the auger 50 and the first surface 103 may be substantially constant with respect to the radial direction of the auger 50 or may gradually increase when progressing in the radial inward direction of the auger 50, as desired. As best shown in FIG. 5, a small axial gap may be present between the second surface 104 of the tapered portion 97 and the end surface 91 of the ring retaining collar 87. The axial gap allows for the tapered portion 97 to flex in a direction towards the second end 99 of the cylindrical portion 96 with the lip 101 of the tapered portion 97 flexing axially and radially outwardly towards the end surface 91, which in turn increases the axial gap present between the first surface 103 of the tapered portion 97 and the end surface 57 of the auger 50 towards the central axis of the auger 50. The flexing of the lip 101 radially outwardly towards the cylindrical portion 96 also increases a cross-sectional flow area through the central opening 102.

The inner circumferential surface of the inner element 81 and an opening formed through the end portion 92 of the outer element 82 cooperate to form a pulp outlet opening 110 through the adjustable end cap 80 that is in alignment with and disposed downstream of each of the central opening 102 formed through the flexible ring 83 and the axis of rotation of the auger 50. The pulp outlet opening 110 forms a pathway for the pulp generated during the juicing process to exit the juicer 10 after having traversed the breaking/grinding/compressing process that occurs between the auger 50 and the screen cone 60.

The adjustable end cap 80 is shown and described as including the assembly of the inner element 81 coupled to the outer element 82, the inner and outer elements 81, 82 may instead be provided as one integral or monolithic structure to which the flexible ring 83 is coupled, as desired, without departing from the scope of the present invention. In contrast to the resiliently flexible material forming the flexible ring 83, the inner element 81, the outer element 82, or a combined structure including the inner and outer elements 81, 82 is formed from a substantially rigid material or materials, such as any plastics, metals, or combinations thereof. The resiliently flexible ring 83 accordingly bears against the rigid material forming the inner element 81 when the pressure is applied thereto by the pulp exiting the juicer 10.

Figure 2:
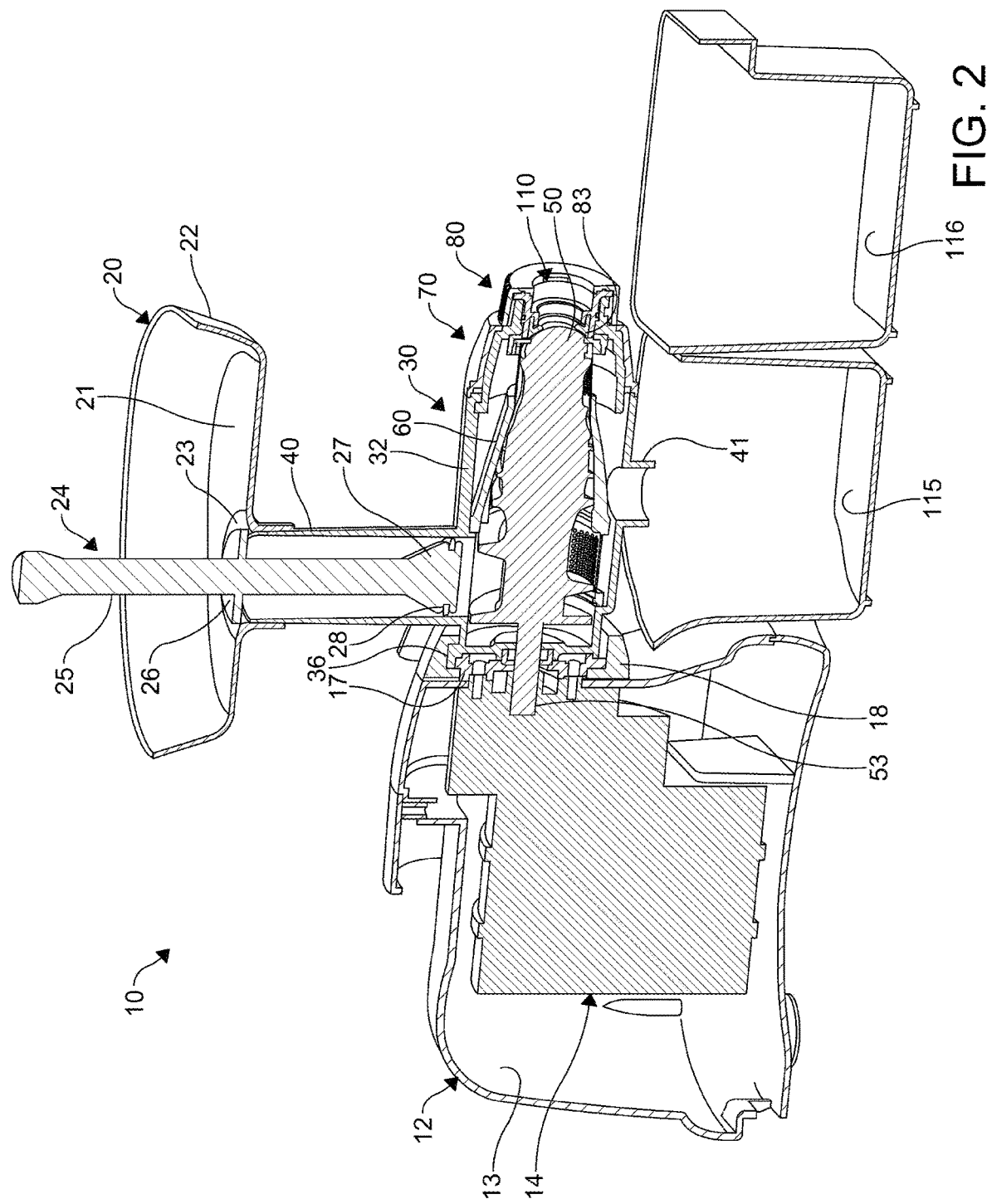
FIG. 2 is a cross-sectional view of the masticating juicer as taken from the perspective of section lines 2-2 of FIG. 1.
Figure 3:
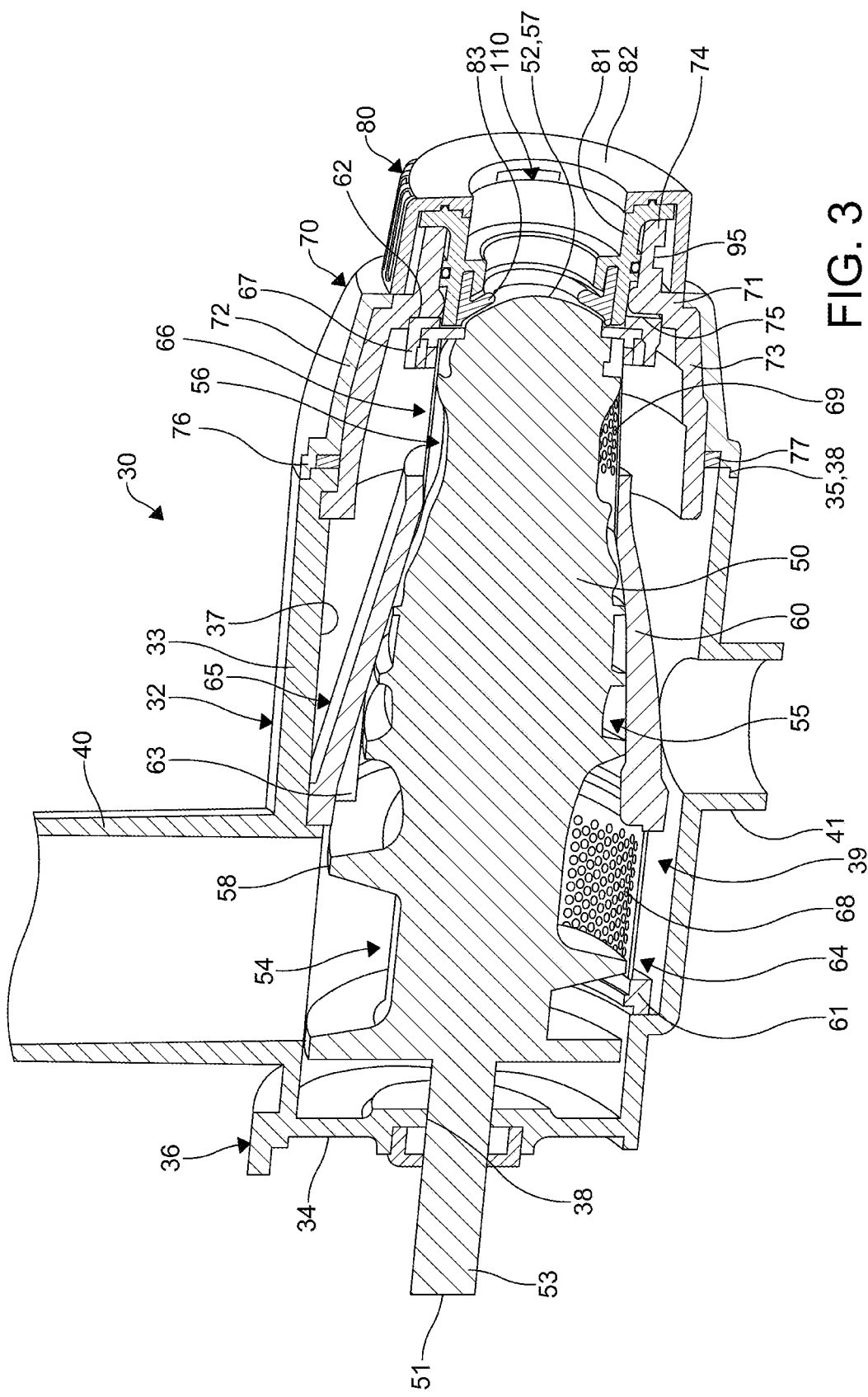
FIG. 3 is an enlarged fragmentary cross-sectional view of a drum, auger, and adjustable end cap assembly of the masticating juicer from the same perspective as FIG. 2.

In operation, the operator first assembles the juicer 10 into the configuration shown in FIGS. 1 and 2 to ready the juicer 10 for the introduction of the corresponding food items to be formed into the juice and the pulp. The adjustable end cap 80 is rotated relative to the drum cap assembly 70 to move the adjustable end cap 80 to a desired axial position relative to the end surface 57 of the auger 50, which increases or decreases the flow cross-section present between the auger 50 and the adjustable end cap 80, and more specifically, the flow cross-section present between the end surface 57 of the auger 50 and the first surface 103 of the tapered portion 97 of the flexible ring 83.

The motor and gear assembly 14 is then activated to cause the auger 50 to rotate at the desired rotational speed within the screen cone 60 and the auger housing 33 of the drum body 32. The operator then places any desired food items in need of juicing within the tray 20 for selective introduction into the food introduction opening 23 thereof and then subsequent passage through the inlet conduit 40 of the drum body 32. The food items then fall into the opening 37 formed within the auger housing 33 along the inlet segment 54 of the auger 50 where the threads 58 of the auger 50 begin the masticating process. The operator may utilize the plunger 24 to press the food items towards the auger 50 to further facilitate the masticating process.

Any juice formed along the inlet segment 54 of the auger 50 falls through the first screen element 68 of the screen cone 60 and into the juice collection region 39 of the auger housing 33. The food items then continue axially along the auger 50 for further masticating between the respective compression segments 55, 65 and the respective outlet segments 56, 66 of the auger 50 and the screen cone 60. The newly formed juice may flow back towards the first screen element 68 or may pass downwardly through the second screen element 69 present within the outlet segment 66 of the screen cone 60 and into the juice collection region 39. The juices collected within the juice collection region 39 flow downwardly by the force of gravity through the outlet conduit 41 and into a juice collection container 115 disposed immediately below the outlet conduit 41.

The masticating process carried out between the auger 50 and the screen cone 60 generates pulp that continues to move axially towards the end surface 57 of the auger 50 rather than falling through one of the screen elements 68, 69. Depending on the types of food items introduced into the juicer 10 and the axial gap established between the auger 50 and the adjustable end cap 80 via the selective rotation thereof, the pulp may begin to apply pressure to the adjustable end cap 80 due to the inability of the pulp to pass through the cross-sectional flow area established between the end surface 57 of the auger 50 and the first surface 103 of the flexible ring 83 at a rate commensurate with the rate at which the food items enter the drum 30. Traditionally, such pressure risks a seizing of the rotation of the auger 50 as the pressure continues to increase during operation of the juicer 10. However, the resiliently flexible nature of the flexible ring 83 overcomes this pressure by allowing for the flexing of the tapered portion 97 as described hereinabove in reaction to the generation of such pressure, which results in the increasing of the cross-sectional flow area and the alleviating of the pressure forming adjacent the end surface 57 of the auger 50. Specifically, the flexing of the tapered portion 97 increases the axial gap present between the end surface 57 and the first surface 103 of the tapered portion 97 in a manner increasing the flow area therebetween while also expanding the central opening 102 through the tapered portion 97 due to the radially outward expansion of the lip 101 forming the central opening 102. The pulp is accordingly able to flow between the auger 50 and the flexible ring 83 more freely, which in turn reduces the pressure applied to the flexible ring 83 as a result of the build-up of pulp adjacent the end surface 57 of the auger 50. Once such pressure is alleviated, the tapered portion 97 of the flexible ring 83 is able to return to the initial position thereof as a result of the resiliency thereof. Once the pulp passes through the central opening 102 of the flexible ring 83 the pulp continues to move axially through the pulp outlet opening 110 and into a pulp collecting container 116 disposed beneath the pulp outlet opening 110.

The use of the flexible ring 83 accordingly improves the juicing rate for certain food items, such as high fiber food items such as celery or wheat grass, by continuously and reactively accommodating any back pressure formed within the juicer 10 when the pulp is not able to freely exit the juicer 10 in the manner desired. This flexible ring 83 also allows for a greater tolerance of the axial gap selected by the operator via rotation of the adjustable end cap 80, thereby preventing instances of seizures or jams even when an improper axial gap has been selected for a given application. The lack of seizure also allows for the pulp remaining within the drum 30 to continue to be masticated for generating additional juice even when such back pressure is first forming. The juicer 10 accordingly prevents stoppages of the operation of the juicer 10 while maximizing the juicing rate thereof. The flexible ring 83 is therefore an advancement over the use of a rigid material immediately downstream of the auger 50 that cannot flex or otherwise deform in reaction to the generation of the pressure applied by the pulp collecting adjacent the end surface 57 of the auger 50.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A masticating juicer comprising:
   an auger configured to rotate within a drum to perform a masticating process with respect to at least one food item introduced into the masticating juicer, the masticating process producing a juice and a pulp;
   an end cap coupled to an end of the drum, the end cap including a flexible ring disposed adjacent an end of the auger and formed from a resiliently flexible material configured to flex in reaction to the pulp applying pressure to the flexible ring, wherein the end cap is configured to be adjustable with respect to an axial direction of the auger to translate an entirety of the flexible ring towards or away from the end of the auger to vary an axial distance present between the flexible ring and the end of the auger.

2. The masticating juicer of claim 1, wherein the flexible ring is formed from an elastomeric material.

3. The masticating juicer of claim 2, wherein the elastomeric material is silicone.

4. The masticating juicer of claim 1, wherein the flexible ring includes a tapered portion.

5. The masticating juicer of claim 4, wherein the tapered portion tapers radially inwardly when extending away from the end of the auger with respect to an axial direction of the auger.

6. The masticating juicer of claim 4, wherein the tapered portion includes a radially inwardly disposed lip forming an opening through the flexible ring through which the pulp passes.

7. The masticating juicer of claim 6, wherein a flow area through the opening increases during a flexing of the flexible ring.

8. The masticating juicer of claim 4, wherein the tapered portion has a truncated cone shape.

9. The masticating juicer of claim 4, wherein the tapered portion includes a tapered surface facing towards the end of the auger.

10. The masticating juicer of claim 9, wherein an entirety of the tapered surface is spaced apart from the end of the auger with respect to the axial direction of the auger, wherein at least a portion of the tapered surface includes the same inclination relative to the axial direction of the auger as an axially aligned portion of the end of the auger.

11. The masticating juicer of claim 4, wherein the flexible ring also includes a cylindrical portion, the tapered portion extending radially inwardly from the cylindrical portion.

12. The masticating juicer of claim 11, wherein the tapered portion intersects the cylindrical portion adjacent a first end thereof disposed towards the end of the auger.

13. The masticating juicer of claim 12, wherein a second end of the cylindrical portion engages a rigid portion of the end cap.

14. The masticating juicer of claim 1, wherein the flexible ring bears against a rigid portion of the end cap during a flexing of the flexible ring.

15. The masticating juicer of claim 1, wherein the end cap and the drum include cooperating threads in a manner wherein a rotation of the end cap corresponds to an adjustment of the end cap with respect to the axial direction of the auger.

16. A masticating juicer comprising:
   an auger configured to rotate within a drum to perform a masticating process with respect to at least one food item introduced into the masticating juicer, the masticating process producing a juice and a pulp;
   an end cap coupled to an end of the drum, the end cap including a rigid portion and a flexible ring coupled to the rigid portion, the flexible ring disposed adjacent an end of the auger and formed from a resiliently flexible material configured to flex away from the end of the auger to increase a flow area between the end of the auger and the flexible ring in reaction to the pulp applying pressure to the flexible ring when exiting the masticating juicer through the end cap, the end cap configured to be adjustable with respect to an axial direction of the auger to translate an entirety of the flexible ring towards or away from the end of the auger to vary an axial distance present between the flexible ring and the end of the auger.

* * * * *